United States Patent [19]

Sebring

[11] 3,846,902
[45] Nov. 12, 1974

[54] METHOD OF MOUNTING A HANDLE TO A VESSEL

[75] Inventor: Burr Sebring, Barrington, R.I.

[73] Assignee: Gorham, a division of Textron Inc., Providence, R.I.

[22] Filed: Apr. 21, 1972

[21] Appl. No.: 246,262

[52] U.S. Cl.............. 29/458, 220/94, 264/262, 264/274
[51] Int. Cl........................ B23p 3/00, B23p 25/00
[58] Field of Search.......... 29/455, 458; 113/120 P, 113/120 XY, 116 A; 220/46, 94; 264/262, 274, 277

[56] References Cited
UNITED STATES PATENTS

| 311,092 | 1/1885 | West.............................. 264/274 X |
| 1,113,265 | 10/1914 | Viard............................. 220/94 R |
| 1,191,547 | 7/1916 | Wiedeman....................... 29/458 |
| 1,960,042 | 5/1934 | Andrus........................... 264/274 X |
| 2,268,768 | 1/1942 | Nathanson...................... 264/274 X |
| 3,434,346 | 3/1969 | Demyon......................... 220/46 R X |
| 3,579,802 | 5/1971 | Gajouski........................ 29/455 X |
| 3,702,024 | 11/1972 | Baker............................. 29/455 X |

FOREIGN PATENTS OR APPLICATIONS

| 503,878 | 4/1939 | Great Britain.................. 220/94 R |
| 1,030,744 | 5/1966 | Great Britain.................. 220/94 R |
| 86,101 | 7/1957 | Netherlands.................... 220/94 R |

Primary Examiner—Charlie T. Moon
Attorney, Agent, or Firm—Waters, Roditi, Schwartz & Nissen

[57] ABSTRACT

An arrangement and method for mounting a handle having a hollow open-ended portion and being formed of a heat-conductive material to a hot liquid-containing vessel including fastening a stud to the vessel, positioning an insulating O-ring about the stud, filling the hollow handle end portion with an insulating, self-setting, cementitious material, encompassing the stud with the cementitious material-containing handle end portion so as to compressively contact the ring, and letting the material set so as to form a thermally-insulated rigid gripping assembly between the handle and the vessel.

4 Claims, 3 Drawing Figures

PATENTED NOV 12 1974 3,846,902

METHOD OF MOUNTING A HANDLE TO A VESSEL

1. Field of the Invention

This invention relates to a handle mounting and to a method for mounting a handle constituted essentially of a heat conductive material onto a hot liquid-containing vessel.

When a handle, which consists of heat conductive material, is mounted onto or fastened to a vessel containing hot liquids, such as, for example, a cooking utensil, coffee or tea pot, tureen, gravy boat, decanter or the like, heat emanating from the liquid through the vessel wall is frequently conducted to the gripping portion of the handle, thereby rendering the latter too hot to hold, and requiring the use of an insulating glove or pot holder. In order to prevent the heating of such handles or reduce temperature increases to manageable levels, suitable thermally insulating members are generally interposed between the vessel and the gripping portions of the handle. These insulating members usually provide an effective barrier to the conduction or conveyance of heat from the hot liquid-containing vessel to the portions of the handle normally grasped during manipulation thereof.

2. Discussion of the Prior Art

Handles which are constituted of generally heat conductive material are usually attached to or mounted onto hot liquid-containing vessels by soldering the ends of the handle to the body or surface of the vessel. Furthermore, in order to prevent the conduction of heat from the vessel to the gripping portions of the handle, insulators are generally inserted at the points in the handle which are in proximity to the junctures between the vessel and the handle, thereby rendering the grasped or gripping portion of the handle thermally insulated with respect to the hot vessel. This, in effect, requires the soldering of two projecting handle attaching portions to the vessel, the soldering of insulators to the free ends of each of the projecting portions, and the soldering of the gripping portion of the handle to each of the insulators, so as to necessitate, in toto, six soldering operations.

Additionally, the positioning of insulators intermediate the gripping portion of the handle and the handle attaching projections mounted on the vessel, renders the handle mounting operation not only uneconomic, but also disadvantageous from an aesthetic viewpoint, since the insulators are generally constituted of a different material than that of the handle or vessel. This is of particular importance when the handle and vessel are formed of plated holloware or sterling holloware, wherein continuity in overall appearance is of even greater significance than in ordinary cooking utensils, stainless steel or plated steel vessels.

Other arrangements for mounting heat conductive handles onto hot liquid-containing vessels utilize suitable externally assembled fasteners or bolts in combination with insulators which prevent heat-conductive metal-to-metal contact between the handles and the vessels. This, however, has proven unsatisfactory because of the tendency of the handles to loosen during prolonged use, and also because of detrimental aesthetic effects on plated or sterling holloware resulting from the use of external fasteners.

SUMMARY OF THE INVENTION

The present invention readily obviates the disadvantages and drawbacks encountered in the prior art methods and arrangements of mounting a heat-conductive handle to a hot liquid-containing vessel, while concurrently providing thermal insulation therebetween, by contemplating the provision of a novel mounting structure on the vessel engageable with the ends of the handle so as to cause the latter to grippingly and rigidly fasten to the vessel. In this connection, the present invention features the mounting of a hollow-ended heat conductive handle on a vessel by fastening one or more projecting studs onto the exterior surface of the vessel, positioning a toroidal, generally compressible insulating member, having an O-ring configuration, about each of the projecting studs, filling the hollow ends of the handle with a self-setting, heat impervious and thermally insulating cementitious material, and superimposing the hollow end portions of the handle about the projecting studs to provide compressive contact between the end surfaces of the handle ends and the insulating members for compressing the latter against the surface of the vessel. The self-setting cementitious material within the hollow ends of the handle, upon setting or curing, forms a permanent bond with the projecting studs and with the interior of the handle to provide a rigid gripping assembly between the handle and vessel while concurrently, the positioning of the insulating members prevents metal-to-metal contact between the handle ends and the vessel, to thereby constitute an effective heat barrier.

Another aspect of the present invention lies in that it reduces the soldering operations and eliminates the sectionalized handle structure required in prior art handle mounting arrangements by eliminating the used for insulators between the gripping portion of the handle and the projecting handle attaching portions which are mounted on the vessel. This, reduces the need for an undue multiplicity of soldering operations while it concurrently facilitates the use of a unitary or single-piece handle structure affording a highly satisfactory level of aesthetic design appeal.

Accordingly, it is an object of the present invention to provide an improved and unique thermally insulative handle mounting for a hot liquid-containing vessel.

Another object of the present invention is to provide a heat-conductive unitary handle structure adapted to be mounted on a hot liquid-containing vessel so as to be thermally insulated with respect to the vessel.

Still another object of the present invention is to provide for a novel method of mounting, in a thermally insulative manner, a heat conductive handle of unitary structure onto a hot liquid-containing vessel.

BRIEF DESCRIPTION OF THE DRAWING

These and other objects of the present invention may be more readily understood, reference being had to the accompanying drawing, wherein.

DETAILED DESCRIPTION

Figure 1:
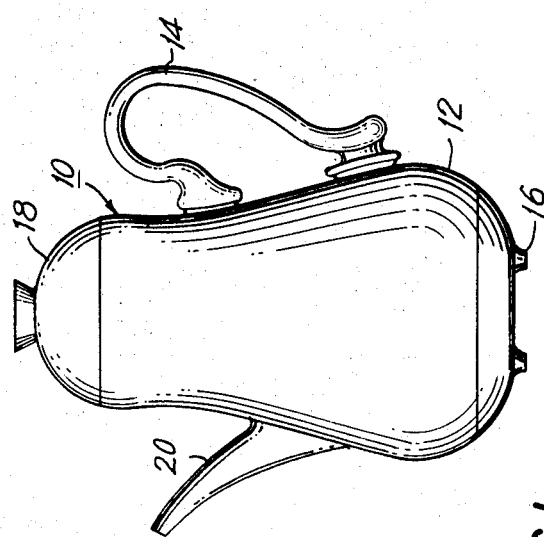
FIG. 1 is an elevational view of a coffee percolator including a handle mounted thereon in accordance with the present invention.

Referring now in detail to the drawing, and particularly FIG. 1, there is illustrated a coffeemaker or percolator 10 which is basically constituted of a liquid-containing vessel 12 and a handle 14, which is fastened to the latter by the novel mounting arrangement and method according to the present invention. Although the vessel 12 is shown as a coffee percolator, it is obvious that the vessel may be a tea pot, tureen, cooking utensil, gravy boat, decanter, or any other type of receptacle adapted to contain hot contents. As shown, the coffee percolater 10 also includes suitable leg portions 16, a cover 18, and a pouring spout 20, all of these elements being well known in the art and not forming a part of the invention.

Figure 3:
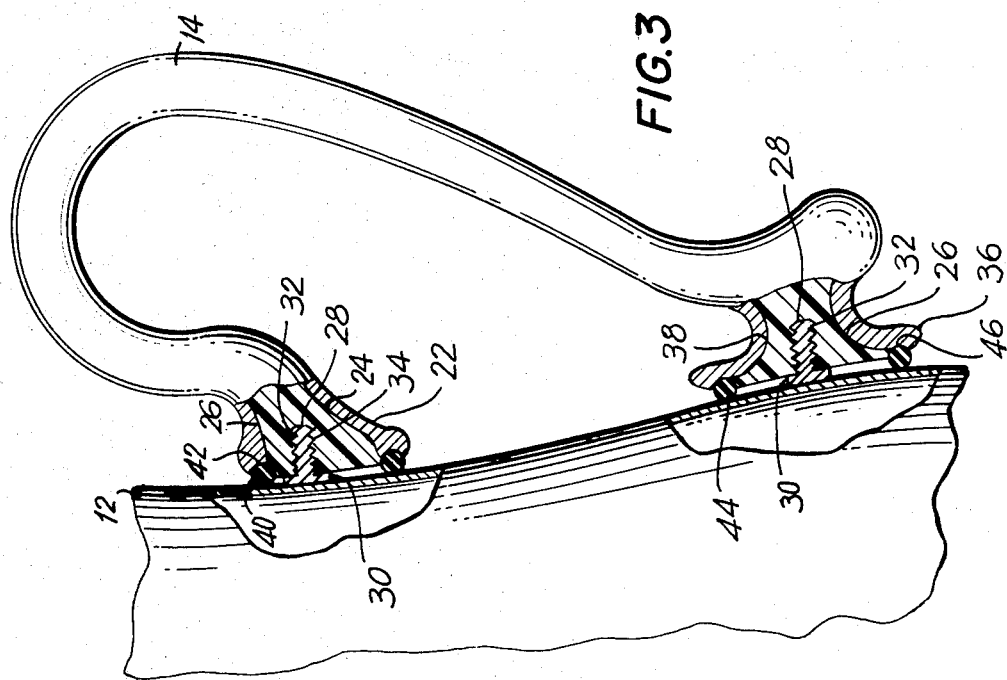
FIG. 3 is an enlarged fragmentary sectional view of the portions of the coffee percolator of FIG. 1 illustrating the detailed construction of the handle mounting arrangement.

The handle 14, as shown in FIGS. 1 and 3, may be constitued of a heat conductive metallic material, such as, for example, plated holloware, sterling holloware, or any other suitable material. As shown, the upper end portion 22 of the handle 14 includes an open-ended cavity 24, which is adapted to receive a quantity of a self-setting, cementitious material 26. The material 26 has inherent heat-insulative characteristics, and may be constituted of a heat-impervious epoxy resin, or similar self-curing or self-setting material.

A cylindrical elongate metal stud 28, having an enlarged base portion 30 is soldered, brazed, welded, or spot welded, to the exterior surface of the vessel 12 by means of the base portion 30, so as to extend substantially radially from the vessel. The shank portion 32 of the stud 28 may have one or more external peripheral grooves 34 formed therein, the purpose of which will be explained in greater detail hereinbelow.

The handle 14 further includes, as shown, a lower end portion 36 having an open-ended cavity 38 which is filled, in a manner analogous to that of the upper cavity 24, with a quantity of cementitious mixture 26.

A second stud 28 is fastened onto the vessel 12 by means of its base portion 30 so as to project from the vessel 12 in coaxial alignment with the handle cavity 38, whereas the first-mentioned stud 28 is positioned in coaxial alignment with the cavity 24 in the upper end 22 of handle 14. The stud 28 extending into the upper cavity 24 of handle 14 is encompassed by an O-ring member 40, which is constituted of a heat-resistant, thermally insulative material. The insulating ring 40 is preferably compressible and resilient so as to be able to conform to the configuration of the vessel 12 upon assembly of the latter with handle 14. The insulating ring 40 is adapted to be engaged by an annular arcuate end surface 42 formed in the end portion 22 of the handle.

The lower stud 28 is encompassed by an insulating ring 44, formed of the same material and similar to ring 40, and which is adapted to be engaged by an annular arcuate end surface 46 formed in the end portion 36 of the handle 14.

Figure 2:
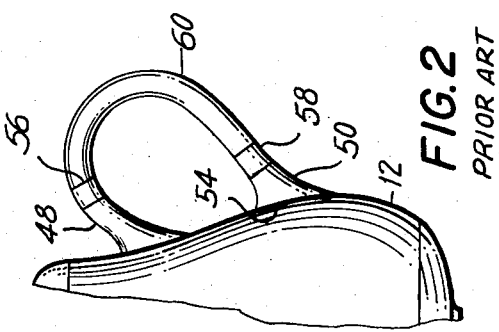
FIG. 2 is a fragmentary elevational view of a coffee percolator illustrating a handle mounted thereon in accordance with the prior art method.

In the prior art, as illustrated in FIG. 2 of the drawing, the handle mounting arrangement includes an upper handle attaching metal projection 48 and a lower projection 50, which are respectively soldered to the surface of the vessel 12 along contact surfaces 52 and 54. The extended ends of projections 48 and 50 have thermally insulative insulators 56 and 58 soldered thereto. The outer surfaces of the insulators 56 and 58 are then adapted to have soldered thereto the curved metallic gripping portion of a handle 60. The prior art handle mounting structure involves six separate soldering operations, in effect, the soldering of the projecting portions of the handle 48 and 50 to the surface of the vessel 12, the soldering of insulators 56 and 58 to the projecting portions 48 and 50, and the soldering of handle portion 60 to the insulators 56 and 58. Moreover, the insulators 56 and 58 which are generally formed of a non-metallic, thermally insulative material, adversely affect the aesthetic appeal of vessels formed from plated holloware or sterling holloware, and disrupted the smooth continuity of the handle design configuration.

The method of assembling the handle 14 with the vessel 12 of the percolator 10, in accordance with the present invention, is effected as follows:

The upper and lower studs 28 are soldered, or otherwise suitably fastened, to the surface of vessel 12, as shown in FIG. 3, by means of the base portions 30, so as to radially extend therefrom in a predetermined parallel or coaxially spaced relationship corresponding to the axial distance between the cavities 24 and 38 of handle 14.

The cavities 24 and 38 in the handle end portions 22 and 36 are filled with a quantity of the self-setting, cementitious material 26, the latter of which is in a viscous or uncured condition. The insulating ring 40 is positioned about the upper stud 28 in alignment with the end surface 42 on handle 14, while the insulating ring 44 is similarly positioned about the lower stud 28 in alignment with surface 46.

The handle 14 is now moved toward the vessel 12 so as to place insulating rings 40 and 44 into compressive relationship between the surface of the vessel 12 and, respectively, the surfaces 42 and 46. Since the insulating rings 40 and 44 are essentially compressible and resilient in nature, during compression they will conform to the curved peripheral surface of vessel 12 so as to provide a sealing relationship between the handle 14 and the surface of vessel 12.

The movement of the handle 14 toward the vessel 12 will cause the cementitious material 26 to envelop the shank portions 32 of studs 28. At that time, the viscous state of the material 26 will cause it to flow into the peripheral grooves 34 formed along the shank portion 32 of the studs. The material 26 is then allowed to set, or in effect, harden or cure for a predetermined time interval, during which the handle 14 is maintained in its predetermined assembled relationship with vessel 12, and to thereby form a rigid gripping assembly between handle 14 and the vessel, by the material 26 hardening about the studs 28 and interiorly of the cavities 24 and 38. If desired, the inner surfaces of the cavities 24 and 38 may be suitable roughened in order to provide an enhanced gripping effect between the material 26 and the handle 14.

The length of each of the studs 28 is determined so as to avoid contact with the inner wall of the hollow end portions 22 and 36 of handle 14, while the surfaces 42 and 46 on the handle 14 are dimensioned so as to avoid contact with the surface of vessel 12 upon assembly, with the insulating rings 40 and 44 essentially acting as spacers. This will prevent any metal-to-metal contact between the vessel 12 and the handle 14, since the mounting of the handle is provided through the intermediary of the cured or hardened cementitious material 26, while the insulating rings 40 and 44 provide for heat-insulating spacing between the ends of handles 14 and the surface of the vessel 12. This, in effect, will provide a rigid gripping assembly between handle 14 and the vessel 10, while concurrently preventing any thermally conductive contact between the handle and vessel.

Furthermore, the method of mounting the handle 14 permits the use of a unitary or single piece handle structure for which is of importance in providing aesthetic appeal, particularly when the handle is used with plated or sterling holloware, or decorative utensils.

Although the invention has been described with reference to a handle 14 which is mounted onto a liquid-containing vessel with both ends of the handle, the invention may be readily utilized in connection with a straight or L-shaped handle which is only fastened or mounted to a vessel by means of a single end mounting arrangement.

While there has been shown what is considered to be the preferred embodiment of the invention, it will be obvious that modifications may be made which come within the scope of the disclosure of the specification.

What is claimed is:

1. A method of forming a rigid, thermally insulated connection between a liquid vessel and a heat-conductive handle having at least one hollow end portion positioned proximate to said vessel, comprising the steps of; fastening at least one stud means to said vessel so as to extend therefrom; positioning a heat-insulating ring member about said stud means, one side wall of said ring member contacting the surface of said vessel about said stud means; filling the hollow end portion of said handle with a self-setting, heat-insulating, cementitious material; and superimposing the hollow handle end portion containing said cementitious material over said stud means in spaced relationship therewith, the end surface of said handle end portion contacting the opposite side wall of said ring member so as to form a thermally insulated rigid gripping assembly between said handle and said vessel upon setting of said cementitious material.

2. A method as claimed in claim 1, wherein said handle end surface is moved into compressive engagement with said opposite side wall of the ring member, said ring member being constituted of a compressible material to conform to the surface contour of said vessel.

3. A method as claimed in claim 1, wherein said stud means is soldered to the surface of said vessel.

4. A method as claimed in claim 1, said stud means having at least one peripheral groove, said cementitious material being adapted to flow into said groove so as to grip said stud means upon setting of said material.

* * * * *